United States Patent [19]

Hasebe et al.

[11] Patent Number: 5,760,520

[45] Date of Patent: Jun. 2, 1998

[54] MOTOR

[75] Inventors: Masahiro Hasebe, Anjo; Yasuo Yamaguchi, Hekinan, both of Japan

[73] Assignee: Aisin AW Co., Ltd., Japan

[21] Appl. No.: 778,711

[22] Filed: Dec. 27, 1996

[30] Foreign Application Priority Data

Dec. 27, 1995 [JP] Japan .................... 7-351209

[51] Int. Cl.$^6$ .............. H02K 1/22; H02K 1/00; H02K 1/06

[52] U.S. Cl. .............. 310/261; 310/156; 310/216; 310/217

[58] Field of Search .................... 310/156, 216, 310/217, 261, 42

[56] References Cited

U.S. PATENT DOCUMENTS

| | | | |
|---|---|---|---|
| 4,585,967 | 4/1986 | Mayer et al. | 310/217 |
| 4,642,502 | 2/1987 | Carpenter et al. | 310/156 |
| 4,792,713 | 12/1988 | Bush | 310/217 |
| 4,795,936 | 1/1989 | Crosetto et al. | 310/156 |
| 4,833,353 | 5/1989 | Hansen | 310/51 |
| 4,881,002 | 11/1989 | Yamaguchi | 310/261 |
| 4,916,346 | 4/1990 | Kliman | 310/216 |
| 4,987,330 | 1/1991 | Murphy et al. | 310/217 |
| 5,144,182 | 9/1992 | Lemmer et al. | 310/217 |
| 5,302,876 | 4/1994 | Iwamatsu et al. | 310/156 |

FOREIGN PATENT DOCUMENTS

63-140645  6/1988  Japan .

Primary Examiner—Steven L. Stephan
Assistant Examiner—Michael J. Wallace
Attorney, Agent, or Firm—Lorusso & Loud

[57] ABSTRACT

A motor has a stator and a rotor that is formed of two rotor parts fitted on a rotor shaft in a fashion preventing the rotor from rotating relative to the rotor shaft. The rotor parts carry permanent magnets arranged with a fixed pitch angle over their outer peripheral faces. The rotor shaft has a single key for engaging with both an engagement groove of the first rotor and an engagement groove of the second rotor. The engagement groove of each steel plate forming the rotor parts is formed in a position shifted ½ of the skew angle from the pole center of a given one of the permanent magnets. The steel plates of the first rotor part and the steel plates of the second rotor part face in opposite directions when fitted to the key of the rotor shaft, thereby providing the predetermined skew angle between the two rotor parts.

3 Claims, 7 Drawing Sheets

MOTOR

BACKGROUND OF THE INVENTION

1. Field of the Invention

The present invention relates to an electric motor and, more particularly, to an electric motor in which the magnetic poles of the permanent magnets of a rotor are provided with a skew angle.

2. Description of the Related Art

In conventional electric motors, particularly, DC brushless motors comprising permanent magnets on a rotor, it is a known art to skew (or provide a twist angle for) the teeth and slots arranged on the stator for supporting coils, in order to reduce cogging torque or torque ripple. However, with such a stator with skewed teeth, the coils must be inserted into spirally twisted slots, thus making it difficult to automate the production processes and thus impeding the mass production of motors.

In alternative arts, the magnetic poles of the rotor are skewed. One such prior art arrangement has permanent magnets or cores arranged in a spiral manner around a rotor shaft. In another prior art arrangement, a plurality of rotor parts (two parts in a simplest divided rotor construction) divided in the axial direction are disposed in a twisted or offset arrangement on a rotor shaft. Japanese published patent application laid-open No. SHO 63-140645 discloses a technology for reducing torque ripple that may be termed a blending of the aforementioned two arrangements, in which divided cores each comprising a laminate of steel plates and carrying a number of permanent magnets corresponding to the number of the magnetic poles are mounted on and arranged around a rotor shaft in such a manner that the divided cores are shifted stepwise by one slot pitch of the core of the stator at a time, to provide a predetermined skew angle.

Normally, the core of a rotor is mounted on a rotor shaft by engaging means, such as keys (extending through the key grooves formed on the core and the shaft) or splines (ridges and grooves), to restrain the core from rotating. Therefore, to position the two halves of a rotor (in a simplest dividing construction) to a rotor shaft with a skew angle, it is required that either the engagement means of the rotor shaft or the engagement means of the rotor be provided in a twisted or offset position.

In a half-divided or dual rotor construction where the first and second rotor parts are fitted onto a rotor shaft while twisted or offset by a predetermined twist or angular offset, a reduction in the number of items of component parts may be attempted by uniformly forming the steel plates for constituting the first and second rotor parts into a suitable shape. If such uniformly shaped steel plates are to be used, it becomes necessary to form first and second offset rotor part engaging means on the rotor shaft, that is, key grooves if key coupling is employed, or ridges and grooves if spline coupling is employed (hereinafter, collectively but not limitingly referred to as "engagement grooves"), in such a manner that the engagement grooves for the first rotor part is relatively shifted from the engaging grooves for the second rotor part by a skew angle in a circumferential direction. Thus the processing or machining of the rotor shaft will become complicated.

If the engagement grooves on the rotor shaft are simply formed as grooves continuously extending in the direction of the axis in order to avoid complicated rotor shaft processing steps, it becomes necessary to relatively differentiate the position of the engagement grooves of the laminated steel plates forming the first rotor part from the position of the engagement grooves of the second rotor part steel plates, with respect to the position of recesses formed on the steel plates for fitting magnets. This will result in two different shapes of core steel plates, increasing the number of component part items. This discussion can be applied to cases where the number of divisions of a rotor is increased. Thus, both arts described above will lead to cost increases.

SUMMARY OF THE INVENTION

Accordingly, it is a first object of the present invention to provide a motor in which the magnetic poles formed by the permanent magnets of the rotor are provided with a predetermined skew angle while avoiding complicated processing steps and an increase in the number of component part items.

A second object of the present invention is to reduce torque oscillation of a motor caused by cogging torque by providing a predetermined skew angle.

A third object of the present invention is to reduce torque ripple of a motor by providing a predetermined skew angle.

According to the present invention, there is provided a motor including a rotor shaft; a rotor having a plurality of rotor parts including at least first and second rotor parts each of which is fitted on the rotor shaft in a manner that prevents rotation relative to the rotor shaft, and has a plurality of recesses formed on an outer peripheral face thereof for arranging permanent magnets with a fixed pitch angle; and a stator disposed radially outward from the rotor. The rotor shaft comprises engaging means extending in a direction of the axis of the rotor shaft, for fitting into both an engagement groove of the first rotor part and an engagement groove of the second rotor part formed in such a manner that the engagement groove of the first rotor part aligns with the engagement groove of the second rotor part. Each of the first rotor and the second rotor comprises a laminate of a plurality of steel plates. Each of the steel plates has an engagement groove for engaging with the engaging means of the rotor shaft. The laminate engagement groove is formed in a position shifted from a center of a given one of the recesses by a predetermined angle (that is greater than 0 and less than P/2 where P is a pitch angle with which the permanent magnets are arranged. The steel plates of the first rotor part and the steel plates of the second rotor part face in opposite directions when the steel plates of the first rotor part and the steel plates of the second rotor part are fitted to the engaging means of the rotor shaft.

In this construction, the steel plates to be laminated to form the first and second rotor core parts have the same shape in which each steel plate has an engagement groove in an angular position shifted a predetermined angle θ from the center of a given one of the recesses for arranging permanent magnets. By fitting the laminates of the steel plates for the first and second rotor parts to the common engaging means provided on the rotor shaft so that the two laminates face in opposite directions, that is, the laminates are inverted in terms of front and reverse faces, the construction achieves the predetermined skew angle 2θ between the magnetic poles of the first rotor part and the magnetic poles of the second rotor part. The motor of this invention thus makes it possible to use uniformly shaped steel plates to form the first and second rotor core parts and, at the same time, simplify the shape of engaging means of the rotor shaft, avoiding an increase in the number of component part items and complicated processing steps and reducing production costs.

It is preferred that the predetermined angle θ be determined as follows: if $0<\theta\leq P/4$, then $\theta=\{(n/2)+(1/4)\}\times S$, and if $P/4<\theta<P/2$, then $\theta=(P/2)-\{(n/2)+(1/4)\}\times S$ where S is a slot pitch angle of the stator, and n is an integer.

By determining the predetermined angle θ as $\theta=\{(n/2)+(1/4)\}\times S$, or $\theta=(P/2)-\{(n/2)+(1/4)\}\times S$, the skew angle 2θ between the first and second rotor parts inverted from each other becomes ½ of the slot pitch angle S of the stator, so that the cogging torques of the first and second rotor parts occur at a rate of one cycle per a slot but shifted from each other by half the cycle. Since the cogging torques occurring in the first and second rotor parts thus cancel each other, the torque oscillation caused by cogging torques will be reduced. Thus, by offsetting cogging torques, a significant factor of the torque oscillation of a motor, this preferred construction reduces the entire torque oscillation, besides achieving the advantages mentioned above.

It is also preferred that the predetermined angle θ be determined as follows: if $0<\theta\leq P/4$, then $\theta=\{n+(1/2)\}\times S$, and if $P/4<\theta<P/2$, then $\theta=(P/2)-\{n+(1/2)\}\times S$ where S is a slot pitch angle of the stator, and n is an integer.

By determining the predetermined angle θ as $\theta=\{n+(1/2)\}\times S$ or $\theta=(P/2)-\{n+(1/2)\}\times S$, the skew angle 2θ between the first and second rotor parts inverted from each other becomes an odd-number multiple of the slot pitch angle S of the stator, so that the torque ripples of the first and second rotor parts occur at a rate of one cycle per two slots but shift from each other by half the cycle. Since the torque ripples occurring in the first and second rotor parts thus cancel each other, the torque oscillation caused by torque ripples will be reduced. Thus, by offsetting torque ripples, another significant factor of the torque oscillation of a motor, this preferred construction reduces the entire torque oscillation, besides achieving the advantages mentioned above.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Figure 1:
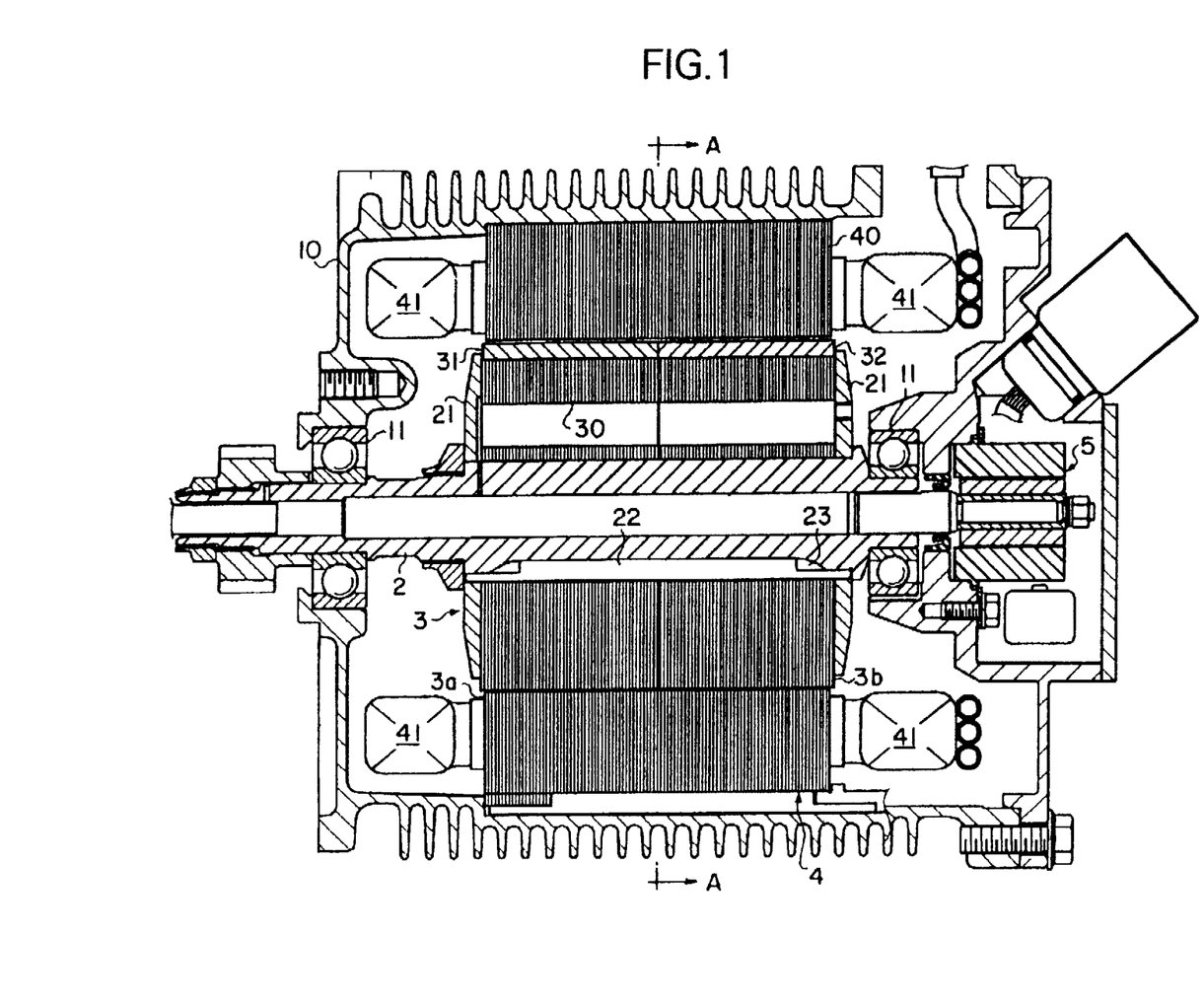
FIG. 1 is a sectional view of a first embodiment of a motor in accordance with the present invention.
Figure 2:
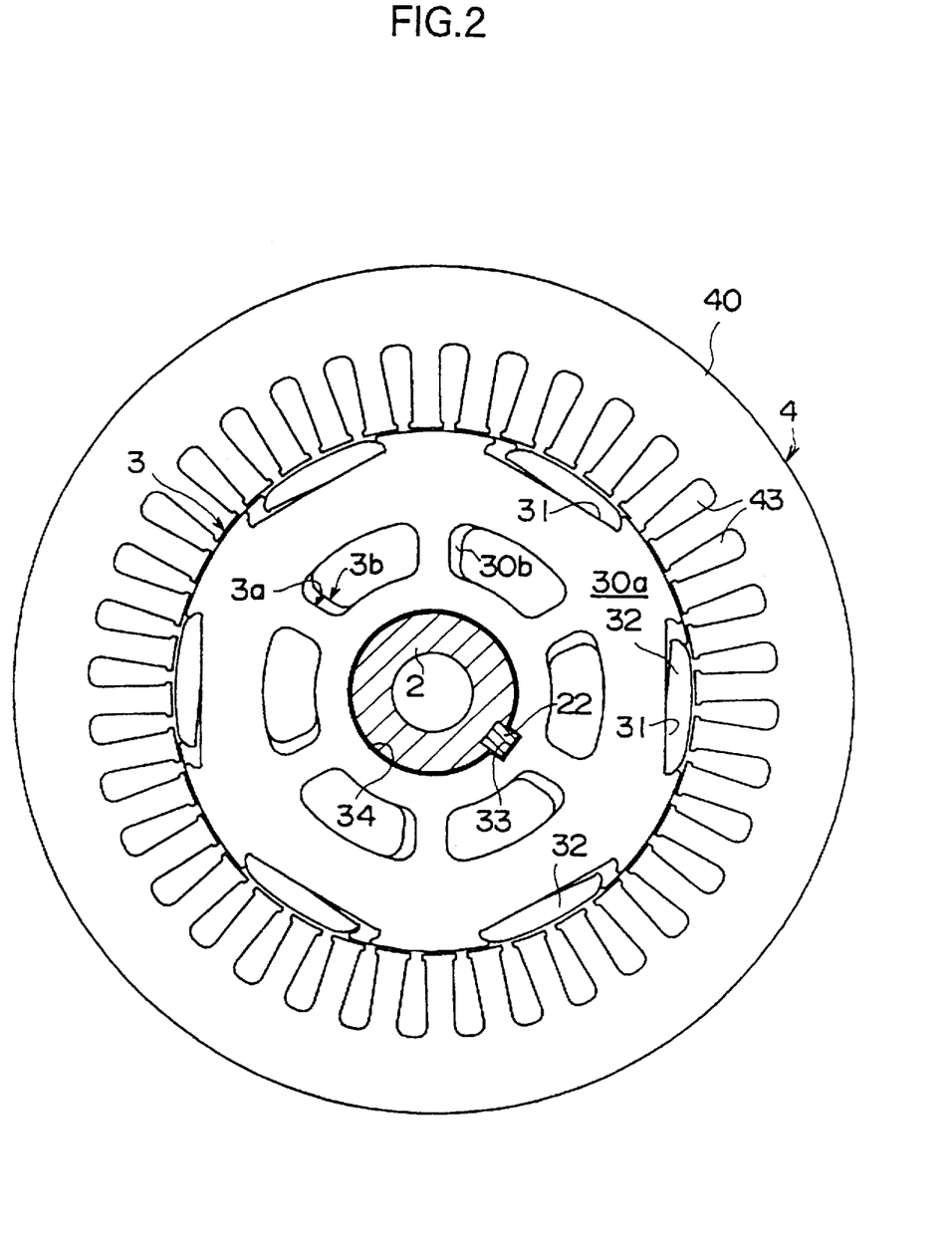
FIG. 2 is a sectional view taken on line A—A of FIG. 1.

Preferred embodiments of the present invention are described in detail hereinafter with reference to the accompanying drawings. The overall construction of a motor in accordance with a first embodiment, FIGS. 1 and 2, comprises a rotor shaft 2 rotatably supported at its opposite ends on a case 10 by bearings 11, and a rotor 3 having first and second rotor parts 3a, 3b. (Hereinafter, the Roman letters "a" and "b" attached to reference Arabic numerals indicate elements related to the first rotor part 3a and the second rotor part 3b, respectively.) Each of the first and second rotor parts 3a, 3b is fitted on the rotor shaft 2 in a manner that prevents the rotor from rotating relative to the rotor shaft 2, and has a number of circumferential recesses 31 corresponding to the number of magnetic poles of the motor (six according to this embodiment). Each circumferential recess 31 embraces a permanent magnet 32 so that the permanent magnets 32 are arranged over the circumference with a fixed pitch angle. A stator 4 comprises a plurality of cores 40 that are laminated in the direction of the axis and disposed radially outward from the rotor 3 by fitting their outer peripheral faces to the case 10 in a rotation-inhibiting manner, and coils (not shown) inserted into slots formed in the core laminate 40. The motor further comprises a resolver 5 fixed to an end of the rotor shaft 2 for rotating together with the rotor shaft 2 and for detecting a magnetic pole position, coil ends 41 protruding from the opposite ends of the stator core laminate 40, and clamp plates 21 that clamp the permanent magnets 32 and laminated rotor cores 30, as shown in FIG. 1. In FIG. 2, the permanent magnets disposed on the first rotor part 3a are omitted to avoid a complicated illustration.

The rotor shaft 2 of the motor has engaging means 22 for engaging with both engagement grooves 33 formed in the first rotor part 3a of the rotor 3 and engagement grooves 33 formed in the second rotor part 3b. According to this embodiment, the rotor shaft 2 has an approximately cylindrical peripheral face without splines, but has a key groove 23 cut in the direction of axis. Thus, the engaging means 22 according to this embodiment is a key 22 fitted into the key groove 23. The key 22 has end extensions that extend out of the key groove 23 in the directions of axis, for fitting into the clamp plates 21, thus inhibiting the clamp plates 21 from rotating. The first and second rotor parts 3a, 3b of the rotor 3 are formed by laminating a plurality of rotor cores 30, formed of blanked electromagnetic steel plates, in the direction of their thickness.

Figure 3:
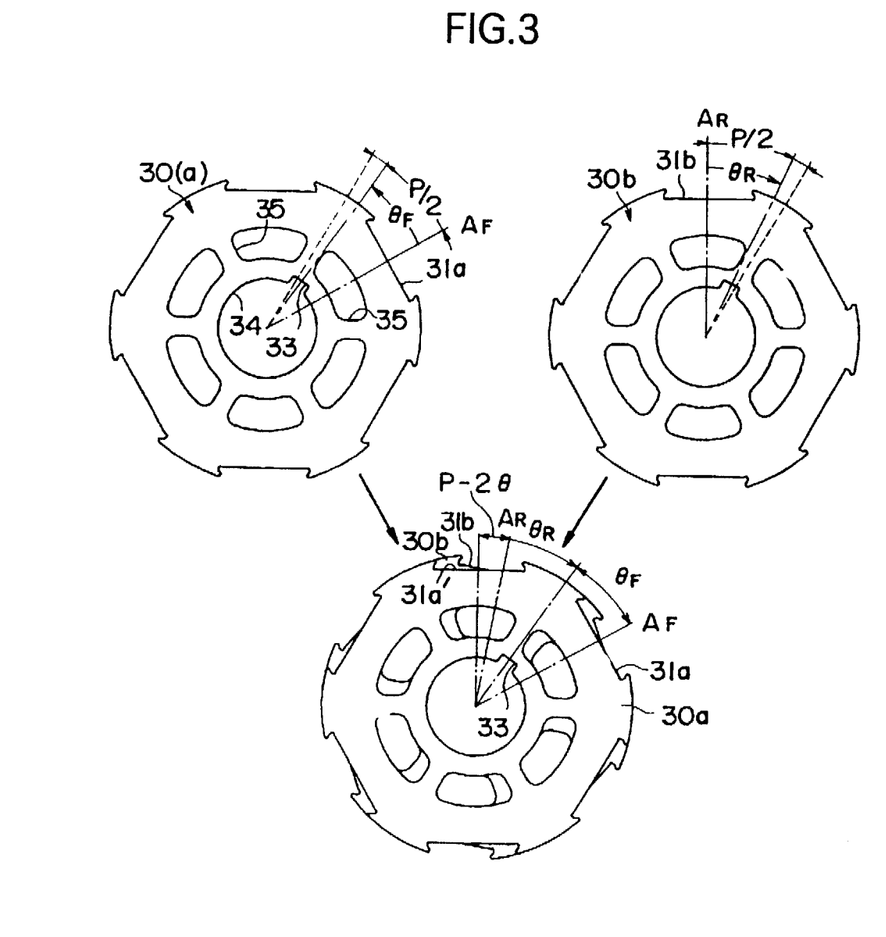
FIG. 3 illustrates assembly of a combination of steel plates forming the cores of the first and second rotor parts, where an increased predetermined angle θ is provided.

Referring to the detailed illustration of FIG. 3, each steel plate 30 has a central hole 34 with a circular cross-sectional shape for fitting onto the outer peripheral face of the rotor shaft 2, and a key groove 33, that is, an engagement groove, for fitting to the key 22 provided as engaging means of the rotor shaft 2. The key groove 33 is formed so that its edge is continuous from the circumferential edge of the central hole 34. In accordance with the invention, the key groove 33 is formed in a position shifted a predetermined angle θ ($\theta_F$, $\theta_R$) from the center A ($A_F$, $A_R$) of a given one of the six dove-tail recesses 31 for receiving the permanent magnets 32 providing the magnetic poles of the motor. More specifically, the position of the key groove 33 is shifted from the center A by an angle θ that is greater than 0 and less than $P/2$ ($0<\theta<P/2$) where P is the central angle (the magnetic pole pitch angle) obtained by measuring, along the circumference, the magnetic pole pitch formed by neighboring permanent magnets. According to this embodiment, the central angle P is 60°.

The steel plates 30 each provided with the thus-positioned key groove 33 are laminated to form the core of the first rotor part 3a and the core of the second rotor part 3b. The steel plates 30a of the first rotor part 3a (shown on the left in FIG. 3, and, hereinafter, the illustrated face is assumed to be the front face) and the steel plates 30b of the second rotor part 3b (shown on the right, in an reversed posture) are inverted from each other in terms of the front and reverse faces when fitted to the key 22 of the rotor shaft 2 (as shown by the illustration at the bottom in FIG. 3). When the steel plates 30a and 30b are thus joined or laid on top of each other in the inverted postures while the key grooves 33 are aligned, the position of a recess 31a of each for 30a of each forward-facing steel plate 30a close to the key groove 33 is shifted the angle $\theta_F$ clockwise from the key groove 33, and the position of a recess 31b of each reverse-facing steel plate 30b close to the key groove 33 is shifted the angle $\theta_R$ counterclockwise from the key groove 33. Thus, the angle between the centers $A_F$, $A_R$ of the recesses 31a, 31b becomes $\theta_F + \theta_R$. In the embodiment shown in FIG. 3, since the angle $\theta$ is set to a large value close to P/2, the recess 31b of the laminate of reverse-facing steel plates 30b comes close to a recess 31a' of the laminate of forward-facing steel plates 30a neighboring the recess 31a corresponding to the recess 31b. Therefore, the angle between the recesses (31a', 31b) of the steel plates 30a, 30b adjacent to each other in the direction of axis becomes P−2θ although the angle between the corresponding recesses 31a, 31b of the steel plates 30a, 30b is 2θ in absolute value.

This embodiment sets the angle θ to a large value close to P/2 in order to avoid aligning the key groove 33 with any oil holes 35 formed in each steel plate 30 for cooling the permanent magnets mounted in the recesses 31 and, instead, positions the key groove 33 at an intervening portion between two adjacent oil holes 35 so that the strength of the steel plates 30 is maintained.

Figure 4:
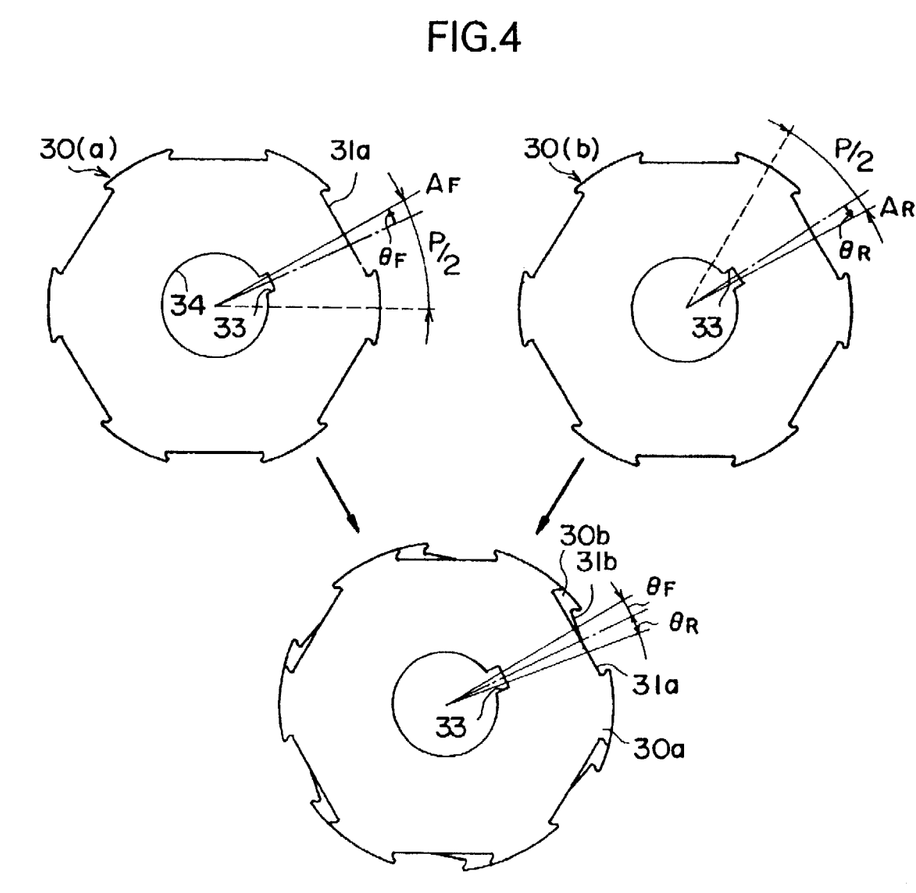
FIG. 4 illustrates assembly of another combination of steel plates, where a reduced predetermined angle θ is provided.

An embodiment in which the angle θ is set to a small value close to 0 is shown in FIG. 4. When laminates of steel plates 30a, 30b are joined in inverted positions in terms of front and reverse faces, with key grooves 33 aligned, the recess 31a of the laminate of forward-facing steel plates 30a close to the key groove 33 is shifted $\theta_F$ counterclockwise from the key groove 33, and the recess 31b of the laminate of reverse-facing steel plates 30b close to the key groove 33 is shifted $\theta_R$ clockwise from the key groove 33. Since the angle θ is set to a small value close to 0, the recess 31b of the laminate of reverse-facing steel plates 30b comes close to the corresponding recess 31a of the laminate of the forward-facing steel plates 30a. Thus the angle between the adjacent recesses 31a and 31b of the steel plates 30a, 30b becomes 2θ.

Figure 5:
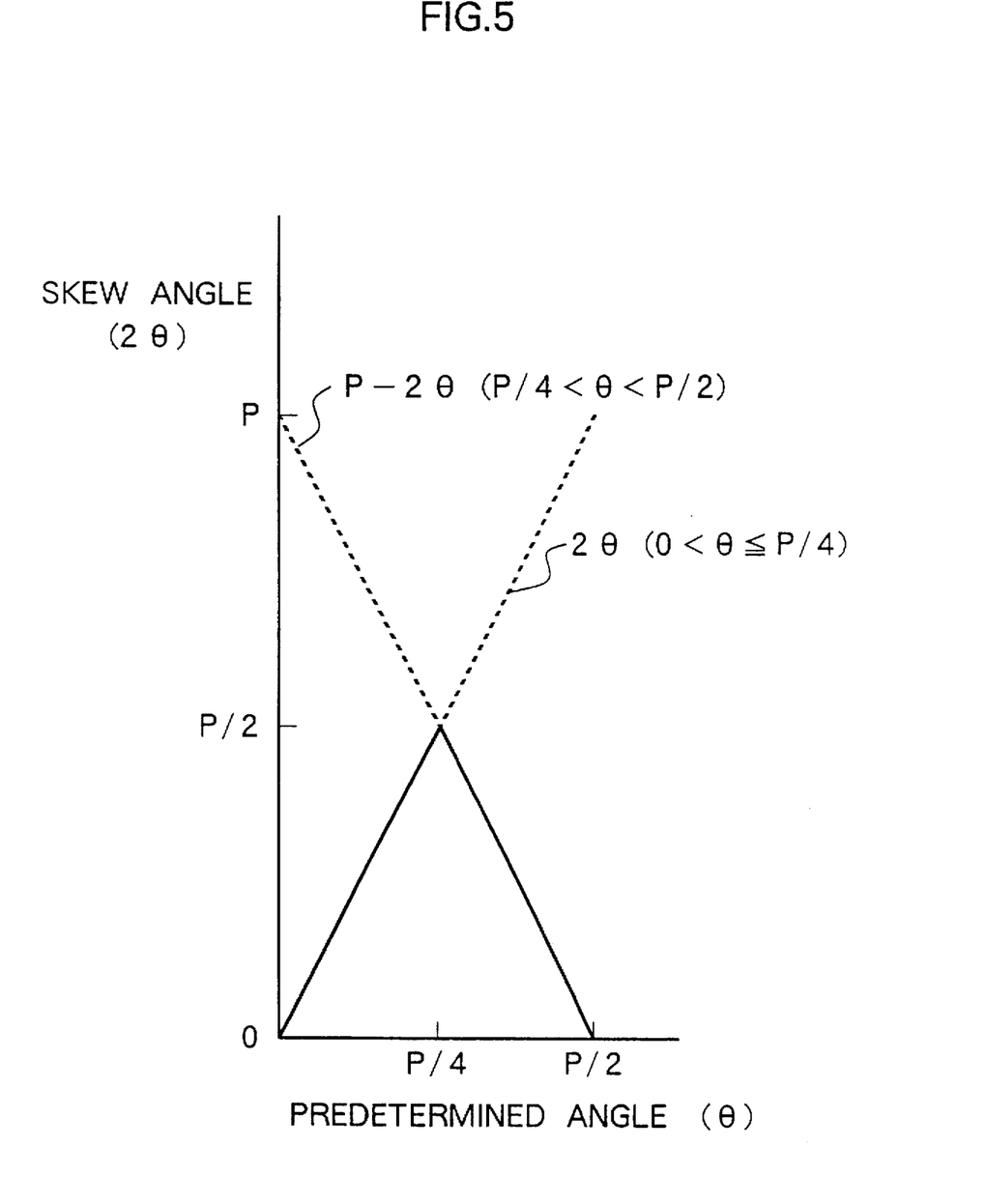
FIG. 5 is a graph indicating the relationship between the position of the engagement groove of a steel plate and the skew angle.

FIG. 5 is a graph indicating the relationship between the angle θ and the skew angle, that is, the angle between adjacent pole centers of steel plates 30 facing opposite to each other. When the angle θ, determined with respect to a reference pole center, exceeds a quarter of the magnetic pole pitch angle P, the reference pole center of a steel plate 30 facing in one direction comes closer to a pole center next to the reference pole center of a steel plate 30 facing in the opposite direction. Thus the skew angle, depending on the predetermined angle θ, reaches a maximum value of P/2 when the angle θ is P/4.

The torque oscillation of motors is based on various factors, and the amplitude and the frequency mode also vary resulting in complicated oscillation waveforms. Thus the setting of a skew angle as described above cannot eliminate all the oscillation torques. For substantial reduction of overall oscillation torques, it is effective to eliminate an oscillation torque having the greatest amplitude. Two methods for determining the skew angle to eliminate significant torque oscillations having large amplitudes are described below.

First described is a method for reducing torque oscillation termed as cogging torque that occurs at a rate of one cycle to one slot of the stator 4 separately for the first and second rotor parts 3a, 3b. The thus-occurring cogging torque can be reduced by setting the skew angle 2θ between the first and second rotor parts 3a, 3b to ½ of the slot pitch angle S of the stator 4. Thereby the torque oscillations occurring in the first and second rotor parts 3a, 3b cancel each other. For this cancellation, the skew angle 2θ or P−2θ is mechanically set to an odd multiple of one-half the slot pitch angle.

That is, if the angle θ is to be set within the range of 0<θ≦P/4, $$2\theta = (2n+1) \times (S/2) \tag{1}$$

where n is 0, 1, 2, 3, . . .

If the angle θ is to be set within the range of P/4<θ<P/2, $$P - 2\theta = (2n+1) \times (S/2) \tag{2}$$

Thus the angle θ is determined as follows.
From equation (1)

$$\theta = \{(n/2) + \tfrac{1}{4}\} \times S$$

From equation (2)

$$\theta = (P/2) - \{(n/2) + \tfrac{1}{4}\} \times S$$

For example, if the slot pitch angle S of the stator 4 is 10°, the magnet pole pitch angle P of the rotor 3 is 60°, and the multiplier n is 0, then the predetermined angle θ becomes 2.5° and 27.5° for the respective ranges.

Another type of torque oscillation termed as torque ripple occurs at a rate of one cycle to two slots of the stator 4 separately for the first and second rotor parts 3a, 3b. To cancel this type of oscillating torques, the skew angle 2θ or P−2θ is mechanically set to a multiple of the slot pitch angle S of the stator 4 by an add number.

That is, if the angle θ is to be set within the range of 0<θ≦P/4, $$2\theta = (2n+1) \times S \tag{1}$$

If the angle θ is to be set within the range of P/4<θ<P/2, $$P - 2\theta = (2n+1) \times S \tag{2}$$

Thus the angle θ is determined as follows.
From equation (1)

$$\theta = \{n + (\tfrac{1}{2})\} \times S$$

From equation (2)

$$\theta = (P/2) - \{n + (\tfrac{1}{2})\} \times S$$

For example, if the slot pitch angle S of the stator 4 is 10°, the magnet pole pitch angle P of the rotor 3 is 60°, and the multiplier n is 0, then the predetermined angle θ becomes 5° and 25° for the respective ranges. Then the skew angle 2θ becomes 10° equaling the slot pitch angle S (=10°).

Thus any of the above-described embodiments is able to adopt a simple construction where the steel plates 30 for forming the cores of the first and second rotor parts 3a, 3b have the same shape that can be formed by identical blanking dies, and the rotor shaft 2 has merely one key groove 23 continuously extending for keying the first and second rotors 3a, 3b. Thus it is possible to avoid an increase in the number of component part items of the rotor 3 and avoid complicated processing of the key 23 of the rotor shaft 2, besides facilitating the setting of a suitable skew angle 2θ for reducing the torque oscillations as intended.

Although, according to the above embodiments, the rotor 3 is divided into only the first and second rotor parts 3a, 3b, it is also possible to apply the present invention to a motor having a rotor that is divided into more than two parts. Embodiments where a rotor comprises three or more rotor parts are described below.

Figure 6:
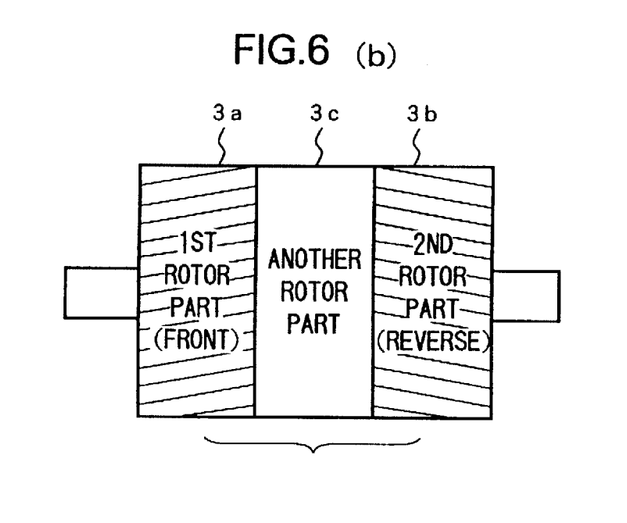
FIGS. 6a, 6b are conceptual diagrams of the arrangement of the first and second rotor parts according to further embodiments of the motor of the present invention.

Figs. 6a, 6b illustrate embodiments where the rotor 3 is divided into three parts. Of the three parts, two parts are formed by the first and second rotor parts 3a, 3b according to one of the embodiments of FIGS. 3 and 4, and the other rotor part 3c has a skew angle with respect to the first and second rotor parts 3a, 3b. The third rotor part 3c may be disposed on an end of either the first rotor part 3a or the second rotor part 3b as shown in FIG. 6a, or between the first and second rotor parts, 3a, 3b as shown in FIG. 6b.

Figure 7:
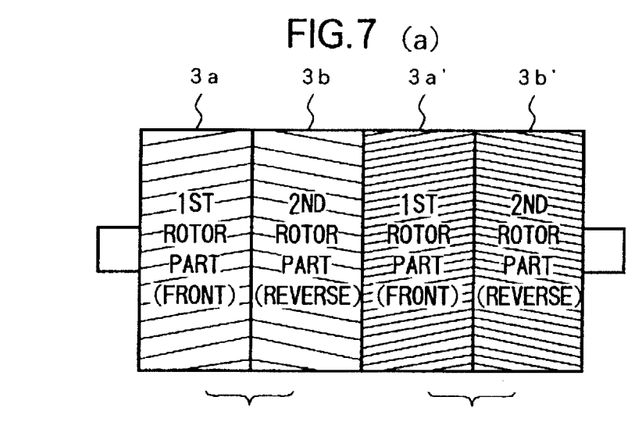
FIGS. 7a, 7c, 7b are conceptual diagrams of the arrangement of the first and second rotor parts according to yet further embodiments.

FIGS. 7a, 7b, 7c illustrate embodiments where the rotor 3 is divided into four parts. Of the four rotor parts, two rotor parts are a pair of first and second rotor parts 3a, 3b, and the other two rotor parts are another pair of first and second rotor parts 3a', 3b'. It is possible to arrange these first and second rotor parts in various patterns. For example, a pair of first and second rotor parts 3a, 3b and the other pair of first and second rotor parts 3a', 3b' are disposed side by side in the direction of axis as shown in FIG. 7a. In another embodiment shown in FIG. 7b, a pair of first and second rotor 3a, 3b sandwich the other pair of the first and second rotors 3a', 3b' in the direction of axis. In still another embodiment shown in FIG. 7c, the rotor parts of one and the other pairs 3a, 3a', 3b, 3b' are disposed in an alternate pattern in the direction of axis.

The above embodiments comprising more than two rotor parts make it possible to form the rotor using a number of steel plate items less than the number of rotor parts, thus avoiding an increase in the number of component part items. Furthermore, the embodiments with more than two rotor parts make it also possible to reduce the torque oscillations in more elaborate fashions, that is, to reduce the torque oscillations of odd number orders and even number orders that cannot be simultaneously reduced by a single skew angle. For example, the first and second rotor parts 3a, 3b are provided with a skew angle for reducing cogging torques, and the third rotor 3c is provided with a skew angle formed with respect to the first or second rotor part, for reducing torque ripples. According to the embodiment shown in FIG. 7a, the first pair of rotor parts 3a, 3b and the second pair of rotor parts 3a', 3b' are provided with a skew angle for reducing cogging torques, and a skew angle for reducing torque ripples is provided between the rotor part 3a of the first pair and between the rotor part 3a' of the second pair.

While the present invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims.

What is claimed is:

1. A motor comprising:
   a rotor shaft;
   a rotor axially divided into a plurality of rotor parts including at least first and second rotor parts, each of which is fitted on the rotor shaft in a manner that prevents rotation relative to the rotor shaft, and each of said rotor parts having circumferentially spaced magnet fittings, said magnet fittings holding a plurality of permanent magnets in respective circumferentially positions spaced to define a pitch angle therebetween; and
   a stator disposed radially outward from the rotor,
   said rotor shaft comprising engaging means extending axially of the rotor shaft for fitting into both a first engagement fitting of said first rotor part and a second engagement fitting of said second rotor part such that the first engagement fitting of said first rotor part aligns with the second engagement fitting of said second rotor part, said engagement fittings being radially aligned with said engaging means along a first radial line,
   each of said first rotor part and said second rotor part comprising a laminate of a plurality of steel plates, each of the steel plates having a plate fitting, the plate fittings of the steel plates of said first and second rotor parts forming said first and second engagement fittings, respectively, the steel plates of said second rotor part being reversed on said rotor shaft relative to the steel plates of said first rotor part so that a center of a given one of said magnet fittings of said first rotor part, defined by position relative to said first engagement fitting, defines a second radial line at a predetermined angle +θ with said first radial line and a center of said given one of said magnet fittings of said second rotor part, in the same position relative to said second engagement fitting, defines a third radial line at a a predetermined angle −θ with said first radial line, θ being greater than 0 and less than P/2 where P is said pitch angle.

2. A motor according to the claim 1, wherein said predetermined angle θ is determined as follows:

if 0<θ≦P/4, $$\theta = \{(n/2)+(1/4)\} \times S$$

if P/4<θ<P/2, $$\theta = (P/2) - \{(n/2)+(1/4)\} \times S$$

where S is a slot pitch angle of the stator, and n is an integer.

3. A motor according to claim 1, wherein said predetermined angle θ is determined as follows:

if 0<θ≦P/4, $$\theta = \{n+(n+(1/2))\} \times S$$

if P/4<θ<P/2, $$\theta = (P/2) - \{n+(1/2)\} \times S$$

where S is a slot pitch angle of the stator, and n is an integer.

* * * * *